June 11, 1968 — W. K. ACKART, SR., ET AL — 3,387,511
TWIST DRILL
Filed May 2, 1966 — 2 Sheets-Sheet 1
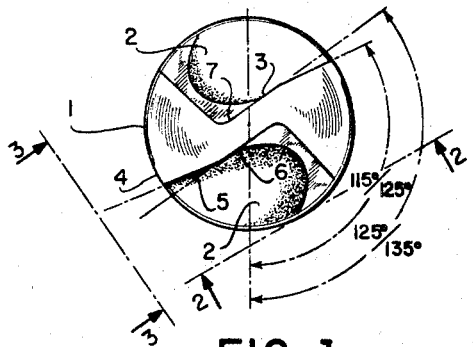
FIG_1
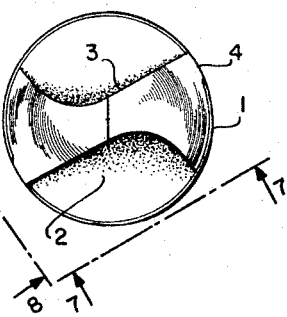
FIG_6
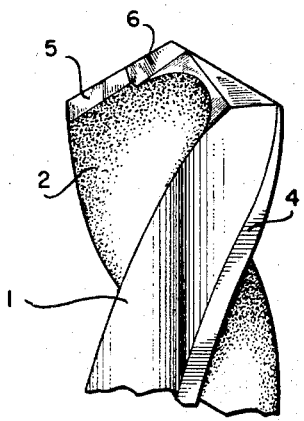
FIG_2
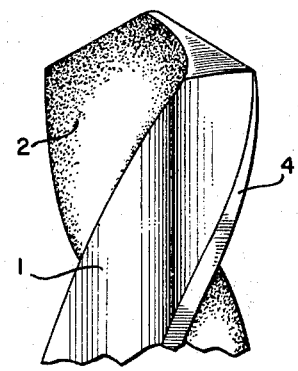
FIG_7
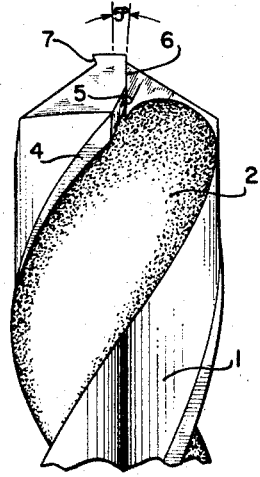
FIG_3
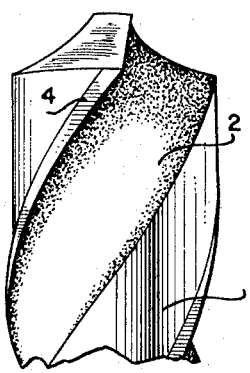
FIG_8
*INVENTORS*
WILLIAM K. ACKART, SR.
HERMAN B. BARISH
BY
*George Sullivan*
Agent

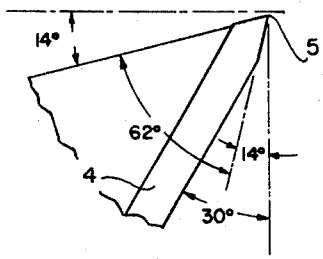
FIG_4
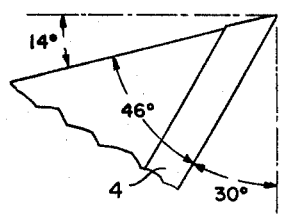
FIG_9
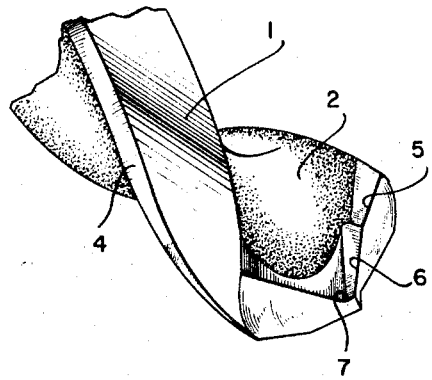
FIG_5
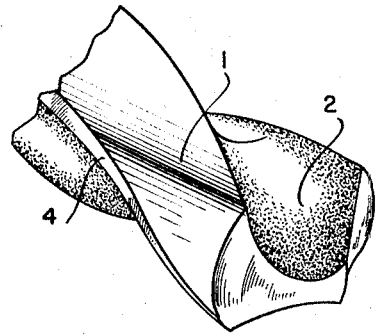
FIG_10

United States Patent Office 3,387,511
Patented June 11, 1968

3,387,511
TWIST DRILL
William K. Ackart, Sr., North Hollywood, and Herman B. Barish, Woodland Hills, Calif., assignors to Lockheed Aircraft Corporation, Burbank, Calif.
Filed May 2, 1966, Ser. No. 546,857
5 Claims. (Cl. 77—70)

This invention relates to drills and more particularly to an improved cutting tip geometry.

In the past various attempts have been made to improve the cutting capabilities of conventional twist drills. While some of these improvements have been accepted and incorporated in drills for conventional metals, the newer space age metals such as titanium have given rise to new problems. Drilling titanium places conflicting demands upon the drill.

One is high torsional strength to prevent the unwinding of the drill which causes chatter and damages the cutting edge, especially near the corners or margins. The other is sufficient tool body at the cutting edge to dissipate the heat generated, since heat is reluctant to flow through titanium. The conventional general purpose drill having a helix angle of approxmiately 30° provides a substantial tool body at the cutting edge but does not have adequate torsional strength and is therefore prone to chattering. Increasing the helix angle reduces the chattering but also reduces the tool body at the cutting edge and hence cutting edge strength, and its ability to dissipate heat. When helix angles are increased, chip flow is also impaired causing the flutes to clog, thereby nullifying the gain in torsional strength.

Furthermore, drilling the newer space age metals, such as titanium, tends to form chips in such a manner that the cutting forces are concentrated on a much smaller area of the cutting face. This increases cutting edge stresses and makes them more susceptible to chipping. The short contact area of the chip on the tool localizes the heating due to cutting. As a result of the heat generated, the cutting edge metal is tempered on a conventional drill and tool wear can develop rapidly, promoting premature tool failure.

A primary object of the invention is to provide a drill having improved heat dissipation and chip flow qualities.

A second object of the invention is to provide a twist drill having high torsional strength and greater cutting edge strength.

A further object of the invention is to provide a drill with improved cutting tip geometry which permits grinding or resharpening with less precision and substantial cost savings.

In accordance with the invention, the cutting lip from the margin to the chisel edge is divided into two sections having different rake angles and different lip to chisel edge angles. The inner or secondary section extends through center and behind the chisel edge.

These and other objects as well as the invention itself will become more apparent from the following description when taken with the drawings, in which:

FIG. 1 is a plan view of the cutting end of a twist drill embodying the invention;

FIG. 2 is a view in elevation of the drill of FIG. 1;

FIG. 3 is a view in elevation of the drill of FIG. 1 and rotated approximately 90° with respect to the position of FIG. 2;

FIG. 4 is an enlarged view in elevation of the primary cutting lip of FIG. 3;

FIG. 5 is a fragmentary view in perspective of the cutting end of a twist drill embodying the invention;

FIG. 6–10 are views of a conventional twist drill corresponding to the views of FIGS. 1–5 respectively.

Referring now to the drawings, the invention will be described in connection with a typical 118° point, two flute, twist drill having a helix angle of 30°. For comparison purposes, a conventional twist drill is shown alongside each view. The drill generally comprises a pair of lands 1 separated by a pair of flutes 2 and having a central web portion 3. Each land has a leading edge or margin 4 with the usual relieved clearance. The cutting lips extend from the periphery inwardly to the chisel edge.

Comparison of FIGS. 1 and 6 illustrates the different configuration of the drill point. The cutting lip in FIG. 1 is divided into two sections, a primary section 5 toward the margin and a secondary section 6 toward the center. The secondary section is preferably 40% to 50% of the lip. The primary cutting lip to chisel edge angle is indicated as about 115° to 125°. The secondary cutting lip to chisel edge angle is correspondingly about 125° to 135°. That is, the difference between the two angles should be about 10°. It is to be noted that the secondary section of the cutting lip extends through center and behind the chisel edge. Furthermore, as best seen in FIGS. 3 and 4 the secondary section 6 is inclined at a rake angle of 5° (or about 4° to 6°) with respect to the longitudinal drill axis and the primary section 5 is inclined at a rake angle of 14° (or about 12° to 16°). As the secondary section 6 passes through the chisel edge a third section 7 is formed behind the chisel edge.

Referring now to FIGS. 2 and 5, it will be noted that the rake angles and lip angles form a pair of corresponding facets which extend inwardly from the margin. Preferably the width of the facet at the margin should be about 10% to 15% of the drill diameter for proper strength and heat dissipation characteristics.

The resulting geometry is of particular interest. For instance, assuming a lip relief angle of 14°, the 30° helix shown in FIG. 9 will have an included angle (between helix and relieved lip) of about 46°. The drill shown in FIG. 4 has an included angle of 62°. It is well-known that in conventional drills, as the helix angle increases the included angle decreases. Yet for drills ground in accordance with the invention, the included angle at the periphery is around 60° to 62° regardless of the helix angle. Instead of the sharp leading edge on the cutting lip as in conventional drills, the invention provides increased tool body at the cutting edge to provide greater cutting edge strength and more rapid heat dissipation. Furthermore, whereas the included angle in a conventional drill varies gradually from the periphery to the center, the cutting lip of the present invention is divided into two sections having fixed rake angles. Since the two sections or facets have different rake angles and cutting lip to chisel edge angles, two chips are formed which do not flow in the same direction and can adjust to the configuration of the flutes. This reduces the tendency to recut the chips and avoids chip-welding-to-margins which is most detrimental to tool life.

Grinding the secondary cutting edge past center provides relief of the heel to eliminate heeling and a path at the third section for improved coolant flow to the point. It will be noted that the two secondary surfaces are parallel and separated by a point, at the chisel, which should not exceed 10% of the drill diameter, if drill wandering is to be avoided and hole sizes held.

From the foregoing, it is believed apparent that a significant feature of the invention is that it permits drills having higher helix angles to be used for hard materials, thereby taking advantage of the increased torsional strength of such drills. This is contrary to the universal recommendation that the low helix drills be used for hard materials and high helix drills be used for the softer materials.

Another significant feature of this invention is that this method of grinding eliminates the problem of maintaining a sharp corner on the grinding wheel, which is necessary when grinding the split section on the popular "crankshaft" point. The latter is difficult to produce in volume both at the factory and in the shop, because the precision required demands the use of a hard and dense wheel which readily loads up and burns the tool. The present invention permits the use of the softer and cooler grinding wheels, thereby eliminating undesirable burning. The value of eliminating burning is obvious and should not be underestimated, since considerable tool life is lost when this problem is ignored. Also, the invention permits a greater corner radius where the secondary section joins the heel relief thereby increasing the strength of the point.

While specific embodiments of the invention have been shown and described, it should be understood that certain alterations, modifications and substitutions may be made to the instant disclosure without departing from the spirit and scope of the invention as defined by the appended claims.

What is claimed is:
1. A twist drill having a plurality of cutting lips each cutting lip comprising a primary section extending inwardly from the periphery of the drill and a secondary section extending inwardly from the primary section, said primary section having a chisel edge angle of between 115° and 125°, and a positive rake angle of between 12° and 16°, said secondary section having a chisel edge angle of between 125° and 135° and a positive rake angle of between 4° and 6°.

2. A drill as defined in claim 1, wherein said secondary section extends behind the chisel edge to form a third section, thereby providing increased coolant flow to the drill point.

3. A drill as defined in claim 2, wherein the width of the chisel edge is approximately 10% of the drill diameter.

4. A drill as defined in claim 1, and further including adjoining facets adjacent the cutting lip and formed by the corresponding rake angles, the width of the facet at the margin being about 10% to 15% of the drill diameter.

5. A drill as defined by claim 1, wherein the difference between the chisel edge angles of the primary and secondary sections is 10°.

References Cited
UNITED STATES PATENTS 2,778,252  1/1957  Oxford _____ 77—70
2,936,658  5/1960  Riley _____ 77—70

FRANCIS S. HUSAR, *Primary Examiner.*